United States Patent
Belardo et al.

(10) Patent No.: US 12,517,725 B2
(45) Date of Patent: Jan. 6, 2026

(54) SYSTEMS AND METHODS OF APPLICATION BUILDERS FOR OFFLINE-CAPABLE APPLICATION

(71) Applicant: Palantir Technologies Inc., Denver, CO (US)

(72) Inventors: Armando Belardo, Washington, DC (US); Tyler Uhlenkamp, New York, NY (US); Vipul Shekhawat, Brooklyn, NY (US)

(73) Assignee: Palantir Technologies Inc., Denver, CO (US)

(*) Notice: Subject to any disclaimer, the term of this patent is extended or adjusted under 35 U.S.C. 154(b) by 139 days.

(21) Appl. No.: 18/114,591

(22) Filed: Feb. 27, 2023

(65) Prior Publication Data

US 2023/0273790 A1 Aug. 31, 2023

Related U.S. Application Data

(60) Provisional application No. 63/314,677, filed on Feb. 28, 2022.

(51) Int. Cl.
*G06F 8/76* (2018.01)
*G06F 8/20* (2018.01)
*G06F 8/36* (2018.01)

(52) U.S. Cl.
CPC .............. *G06F 8/76* (2013.01); *G06F 8/24* (2013.01); *G06F 8/36* (2013.01)

(58) Field of Classification Search
CPC .............. G06F 8/76; G06F 8/24; G06F 8/36
(Continued)

(56) References Cited

U.S. PATENT DOCUMENTS

| | | | |
|---|---|---|---|
| 7,917,890 B2* | 3/2011 | Barcellona | G06F 8/10 717/106 |
| 7,966,426 B2* | 6/2011 | Smith | G06F 16/273 707/610 |

(Continued)

FOREIGN PATENT DOCUMENTS

| | | | | |
|---|---|---|---|---|
| CN | 105051760 A | * | 11/2015 | ....... G05B 19/41885 |
| CN | 116841681 A | * | 10/2023 | |

OTHER PUBLICATIONS

Karnstedt, Marcel, et al. "Semantic Caching in Ontology-based Mediator Systems." Berliner XML Tage. 2003.*

*Primary Examiner* — Francisco J Aponte
(74) *Attorney, Agent, or Firm* — Faegre Drinker Biddle & Reath LLP-Palantir

(57) ABSTRACT

Disclosed are systems and methods for application builders for offline-capable applications. In some embodiments, a method for generating an offline-capable application includes the steps of: accessing an ontology associated with the offline-capable application; accessing one or more application assets associated with the offline-capable application; determining a cache strategy for the offline-capable application, the cache strategy comprising one or more caching rules, at least one caching rule of the one or more caching rules comprising one or more parameters, the one or more parameters comprising a specification of cached data and a cache condition; and building the offline-capable application using the ontology and the one or more application assets based at least in part upon the caching strategy.

18 Claims, 4 Drawing Sheets

(58) Field of Classification Search
USPC .......................................................... 717/107
See application file for complete search history.

(56) References Cited

U.S. PATENT DOCUMENTS

| | | | |
|---|---|---|---|
| 8,209,660 B2 | 6/2012 | Sundararajan et al. | |
| 8,407,593 B2 | 3/2013 | Korpipaa et al. | |
| 8,732,655 B2 | 5/2014 | Pfeifer | |
| 9,675,890 B2 * | 6/2017 | Ahiska | A63F 13/358 |
| 10,223,141 B2 * | 3/2019 | Mars | G06F 8/443 |
| 10,298,620 B1 * | 5/2019 | Havemose | H04L 67/02 |
| 11,182,137 B2 * | 11/2021 | Ramaiah | G06F 9/453 |
| 11,188,354 B1 * | 11/2021 | Yu | G06F 9/455 |
| 11,269,618 B1 * | 3/2022 | Webster | G06F 3/0484 |
| 11,314,507 B2 * | 4/2022 | Liu | G06N 20/00 |
| 11,442,704 B2 * | 9/2022 | Kane | G06F 8/35 |
| 11,467,828 B1 * | 10/2022 | Zhang | G06N 5/04 |
| 11,886,852 B1 * | 1/2024 | Suchak | G06F 8/36 |
| 11,954,112 B2 * | 4/2024 | Siebel | G06F 16/288 |
| 11,954,478 B2 * | 4/2024 | Park | H04L 12/2807 |
| 2014/0280370 A1 | 9/2014 | Oberle et al. | |
| 2014/0282409 A1 | 9/2014 | Nassar | |
| 2014/0297676 A1 | 10/2014 | Bhatia et al. | |
| 2016/0026441 A1 * | 1/2016 | Diez | G06F 16/367 |
| | | | 717/104 |
| 2017/0060562 A1 * | 3/2017 | Lopez | G06F 8/60 |
| 2017/0075659 A1 * | 3/2017 | Warren | G06F 8/40 |
| 2018/0101370 A1 * | 4/2018 | Huang | G06F 8/447 |
| 2018/0246704 A1 * | 8/2018 | Rabins | G06F 8/65 |
| 2020/0007615 A1 * | 1/2020 | Brebner | G06F 9/542 |
| 2020/0110592 A1 * | 4/2020 | Straub | G06F 8/64 |
| 2020/0133922 A1 * | 4/2020 | Tung | G06F 9/54 |
| 2020/0371755 A1 * | 11/2020 | Patni | G06F 8/34 |
| 2021/0019573 A1 * | 1/2021 | Gafni | G06V 10/764 |
| 2022/0292180 A1 * | 9/2022 | Chauhan | H04L 67/02 |
| 2024/0394021 A1 * | 11/2024 | Bhargava | G06F 8/34 |

* cited by examiner

SYSTEMS AND METHODS OF APPLICATION BUILDERS FOR OFFLINE-CAPABLE APPLICATION

CROSS REFERENCE TO RELATED APPLICATIONS

This application claims priority to U.S. Provisional Application No. 63/314,677, filed Feb. 28, 2022, incorporated by reference herein for all purposes.

TECHNICAL FIELD

Certain embodiments of the present disclosure are directed to systems and methods for building software applications. More specifically, some embodiments of the present disclosure relate to systems and methods for building offline-capable software applications.

BACKGROUND

Many enterprises are attempting to operationalize their data using low-code and/or no-code application builders. Application builders are software tools that can use various software components to build customized software applications. These tools enable users who are lack software engineering skills to create tailored applications that help solve business needs.

Hence it is desirable to improve the techniques for building software applications.

SUMMARY

Certain embodiments of the present disclosure are directed to systems and methods for building software applications. More specifically, some embodiments of the present disclosure relate to systems and methods for building offline-capable software applications.

At least some aspects of the present disclosure are directed to a method for building an offline-capable application (e.g., an offline-capable software application). The method includes the steps of: accessing an ontology associated with the offline-capable application; accessing one or more application assets associated with the offline-capable application; determining a cache strategy for the offline-capable application, the cache strategy comprising one or more caching rules, at least one caching rule of the one or more caching rules comprising one or more parameters, the one or more parameters comprising a specification of cached data and a cache condition; and building the offline-capable application using the ontology and the one or more application assets based at least in part upon the caching strategy. The offline-capable application is configured to cache data according to the cache strategy.

At least some aspects of the present disclosure are directed to a computing device comprising one or more memories having instructions stored thereon; and one or more processors configured to execute the instructions and perform the operations comprising: accessing an ontology associated with the offline-capable application; accessing one or more application assets associated with the offline-capable application; determining a cache strategy for the offline-capable application, the cache strategy comprising one or more caching rules, at least one caching rule of the one or more caching rules comprising one or more parameters, the one or more parameters comprising a specification of cached data and a cache condition; and building the offline-capable application using the ontology and the one or more application assets based at least in part upon the caching strategy. The offline-capable application is configured to cache data according to the cache strategy.

BRIEF DESCRIPTION OF THE DRAWINGS

The accompanying drawings are incorporated in and constitute a part of this specification and, together with the description, explain the features and principles of the disclosed embodiments. In the drawings.

DETAILED DESCRIPTION

Figure 1:
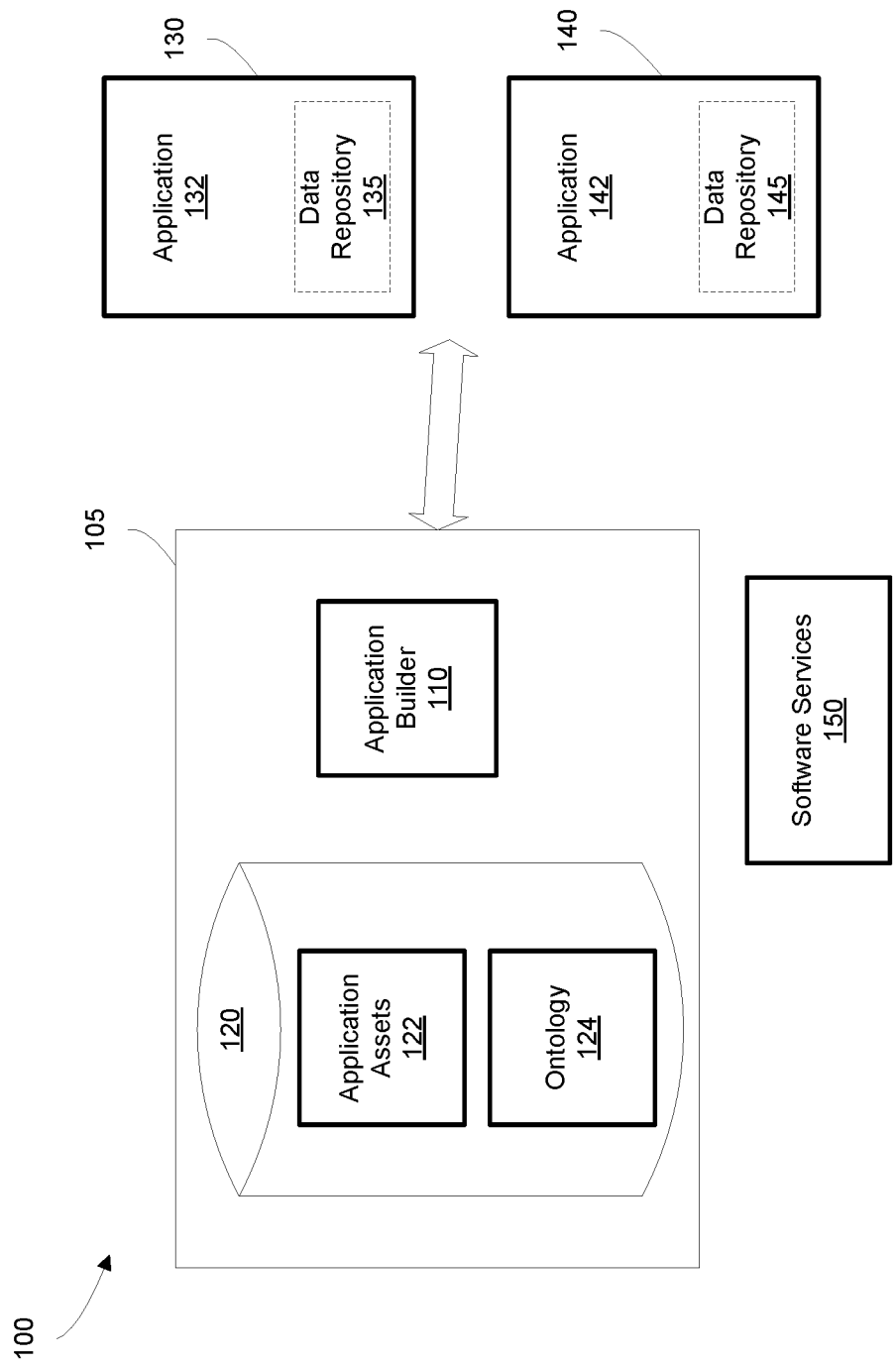
FIG. 1 depicts an illustrative system diagram of an application builder environment, in accordance with certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

One need for application builders (e.g., no-code application builders, semi-no-code application builders) is to build applications that are available offline. In some use cases, connectivity can be intermittent in situations including, for example, users on an airplane, in a mine shaft, out in the field doing maintenance on equipment in a place where network service is lacking, and/or the like. In some examples, no-code application builders need to support a way for users to continue doing their work even without connectivity.

At least some embodiments of the present disclosure are directed to application builders that can create applications capable of working seamlessly offline without requiring customized application development (e.g., code developments). In certain embodiments, an application builder directly connects application assets (e.g., application components, frontend components) to objects and links in an ontology. As used herein, an ontology refers to a structural framework (e.g., data model) containing information and data related to objects and relationships of objects (e.g., functions applicable to objects, links) within a specific domain (e.g., an organization, an industry). In some embodiments, application builders can be customized to define how data should be cached for end users based on relationships between objects. For example, an application builder could specify that an application should proactively cache all the equipment that is assigned to each maintenance technician and these relationships are defined and managed in the ontology.

According to some embodiments, this approach is differentiated on the aspects of an application builder on supporting predefined caching logic based on the coupling the application builder and/or the generated application to the ontology (e.g., the organization's data model). In some embodiments, the generated application is ontology-centric, such that this offline data caching scheme is possible. In certain embodiments, the application builder enables workflows for operations, implemented by applications, to take place when lacking connectivity. In some embodiments, the operations may include disconnected operations conducted by utility companies, mining companies, oil and gas companies, and in a military context. At least certain embodiments of the present disclosure include proactive caching of data (e.g., ontology data, business data) for offline use. In some embodiments, the application builder includes the caching of actions (e.g., business logic or machine learning models) for offline use. As used herein, an action refers to one or more processing logics applied to one or more objects including, for example, creating objects, changing objects, combining objects, linking objects, deleting objects, and/or the like. In some examples, this would enable workflows like having machine learning models created by data scientists deployed to end user devices for offline use.

FIG. 1 depicts an illustrative system diagram of an application builder environment 100, in accordance with certain embodiments of the present disclosure. FIG. 1 is merely an example. One of ordinary skill in the art would recognize many variations, alternatives, and modifications. According to certain embodiments, the application builder environment 100 includes an application builder system 105, one or more application devices 130 and 140, one or more software services 150. In some embodiments, the application builder system 105 includes an application builder 110 and data repository 120. According to some embodiments, the data repository 120 is configured to store one or more application assets 122 and ontology 124. Although the above has been shown using a selected group of components for the application builder environment 100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present disclosure.

According to some embodiments, the application assets 122 include one or more application assets, also referred to as application components. In certain embodiments, the application assets include one or more software components, software libraries, software interfaces, scripts, software services and/or the like. In some embodiments, application assets are written in one or more programming languages (e.g., java, C #, python, etc.). In certain embodiments, the programming languages include scripting languages. In some embodiments, application assets are those application assets compiled into machine readable code. In certain embodiments, application assets include one or more software interfaces to couple to one or more other application assets. In some examples, application assets include data processing models (e.g., machine learning models, deep learning models etc.) to process data. In certain examples, application assets include one or more trained data processing models that have been trained using training data.

According to certain embodiments, the ontology 124 includes ontology data, for example ontology data of one or more domains, one or more organizations (e.g., companies, entities, for-profit organizations, government organizations, non-profit organizations), one or more industries, and/or the like. In one example, the ontology 124 includes ontology data for an oil company. In some embodiments, the ontology 124 incudes ontology data of two or more domains. In certain embodiments, the ontology 124 incudes ontology data of two or more industries. In some embodiments, the ontology 124 includes ontology data of two or more organizations.

According to some embodiments, the application builder 110 uses application assets 122 and ontology 124 to build one or more offline-capable applications (e.g., application 132, application 142) to be deployed and/or installed at one or more application devices (e.g., application device 130, application device 140). In certain embodiments, an application device (e.g., application device 130, application device 140) includes a local data repository (e.g., data repository 135, data repository 145). In some embodiments, the local data repository (e.g., data repository 135, data repository 145) is configured to store local data (e.g., cached data) that can be used when the application device is offline.

According to certain embodiments, the application builder 110 generates a cache strategy for the one or more offline-capable application (e.g., application 132, application 142), where the cache strategy includes one or more caching rules. In some embodiments, the application builder 110 is configured to generate the cache strategy based at least in part upon the application assets and the ontology data associated with the corresponding application. In certain embodiments, the application builder 110 is configured to generate the cache strategy based at least in part upon one or more actions associated with the corresponding application. In some embodiments, at least one caching rule of the one or more caching rules comprises one or more parameters. In certain embodiments, the one or more parameters comprises a specification of cached data and a cache condition. In some embodiments, the cached data includes at least one selected from a group consisting of ontology data, one or more actions, one or more application assets, and one or more configurations. In certain embodiments, the cache condition comprises at least one selected from a group consisting of a type of caching, a cache frequency, a cache time, an invalidation time, an invalidation condition, a network condition, and a purging condition.

In some embodiments, the cache strategy includes one or more caching rules applied to one or more cache layers (e.g., one or more types of application data), where each caching rule of the one or more caching rules includes one or more parameters. In some embodiments, the one or more parameters include a specification of caching object, a type of caching (e.g., time-based caching, push-based caching), a cache frequency, a cache time, a cache condition, invalidation time, network condition, purging condition, retention policy, view policy, and/or the like. In certain embodiments, the cache layers represent types of cached data.

According to certain embodiments, the application builder 110 includes an interface to receive inputs to the cache strategy. In some examples, the interface includes a user interface. In certain examples, the interface includes one or more software interfaces to receive inputs from other systems and/or software services. In some embodiments, the inputs to the cache strategy include an input on the ontology data (e.g., an object, a relationship between objects, etc.) associated with a respective offline-capable application. In certain embodiments, the inputs to cache strategy include an input on one or more application assets (e.g., data processing logics) associated with the offline-capable application. In some embodiments, the inputs to the cache strategy include an input on actions (e.g., the data processing logic applied to an object) associated with the offline-capable application. In certain embodiments, the inputs to cache strategy include an input on one or more configurations (e.g., whether a last saved status of the application should be used) associated with the offline-capable application.

In some embodiments, the cache strategy is generated or updated using a plurality of factors. In certain embodiments, it is important to reduce (e.g., minimize) how much data is cached, for example, to reduce bandwidth and power consumption (e.g., battery consumption). In certain embodiments, the application builder 110 is configured to generate the cache strategy based at least in part on one or more factors, where the one or more factors comprise at least one selected from a group consisting of a power consumption, a connection bandwidth, a cache frequency, and a transparency requirement.

In some embodiments, the factors for the cache strategy include power consumption, bandwidth, cache frequency, transparency, and/or the like. For example, running many background tasks and synchronizations can consume a significant amount of power (e.g., battery power). In some examples, the cache strategy includes a caching rule on when to download new data and/or send queued actions. As an example, the cache strategy includes a caching rule to defer operations that require heavy bandwidth until an application is back on a stable network connection. In some examples, queued actions may not take much bandwidth so the cache strategy may allow queued action sent over a relatively low bandwidth network (e.g., $3^{rd}$ Generation cellular network (3G)). In certain examples, the cache strategy may include a caching rule to download, upload, or synchronize data for a data-intensive application when the application is on a stable network (e.g., WiFi network).

In certain embodiments, the cache strategy includes a caching rule having a parameter on a cache frequency (e.g., how frequently should data be cached for offline reads). In some examples, the cache strategy includes a caching rule on whether the cache frequency can be configurable, for example, by a user. In some embodiments, the cache strategy includes a caching rule on transparency. In some embodiments, a caching rule on transparency specifies whether users can view all of the data that's being cached, purge the cache, and "unsubscribe" from caching rules if they wish. In certain embodiments, a caching rule on transparency includes a caching rule on retention. In one example, the caching rule on retention is a rule to remove certain cache data if the cache data is not accessed in a predetermined amount time. In some embodiments, the cache strategy includes one or more cache rules on when certain data should be cached and/or when certain data should be invalidated.

According to certain embodiments, the cache strategy includes one or more caching rules on application assets, also referred to as an application asset cache layer. In some embodiments, the application asset cache layer includes one or more software components, for examples, software components written in java, C, C #, C++, HTML, other programing language, and/or other script language.

According to some embodiments, the cache strategy includes one or more caching rules on configurations, also referred to as a configuration cache layer. In certain embodiments, the configuration cache layer includes semi-static configurations including, for example, configurations related to ontology configurations, software application configurations, workspace configurations, and/or other configurations. In some embodiments, the configuration data can change, but changes are relatively infrequent, for example, less frequent than the changes of ontology data.

According to certain embodiments, the cache strategy includes one or more caching rules on ontology data, also referred to as an ontology cache layer. In some examples, the ontology cache layer includes ontology data including, for example, objects, object sets, aggregation results, functions, algorithms, models, and/or the like. In certain embodiments, the ontology data of the ontology cache layer can be loaded across one or more software services (e.g., backend services). In some embodiments, the ontology data loads can be triggered via software interfaces and user interfaces, for example, when an object is selected, and linked objects can be loaded. In certain embodiments, the ontology data load can be triggered by one or more software widgets (e.g., object picker, user selectors) querying a backend system (e.g., the software services 150, servers, data center, database) to retrieve data (e.g., query results), and the retrieved data can be cached according to a caching rule on ontology data.

According to some embodiments, the cache strategy including one or more caching rules on one or more actions (e.g., user-input actions, user states), also referred to as an action cache layer. In one example, after a user fills out a form and submits it offline, the cache strategy is configured to cache the action associated with the submitted form and its parameters.

According to certain embodiments, the application builder 110 is configured to build the offline-capable applications 132 and 142 using an identical or different cache strategies. In some examples, the application 132 and the application 142 are built using an identical cache strategy. In certain examples, the application 132 is intended to be used by a first user and the application 142 is intended to be used by a second user different from the first user, the application 132 is built using a first strategy and the application 132 is built using a second strategy different from the first strategy. In some embodiments, the offline-capable applications (e.g., application 132, application 142) are configured to cache data including, for example, download, upload, and delete data, according to a corresponding cache strategy. In certain embodiments, the offline-capable applications (e.g., application 132, application 142) are configured to cache data from one or more software services 150 according to a corresponding cache strategy.

According to some embodiments, the application builder system environment includes one or more data repositories, for example, to store application assets, configurations, user information, application information, ontology data, action data, and/or the like. The data repositories may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components of the application builder environment 100 can execute software or firmware stored in non-transitory computer-readable medium to implement various processing steps. Various components and processors of the application builder environment 100 can be implemented by one or more computing devices, including but not limited to, circuits, a computer, a cloud-based processing unit, a processor, a processing unit, a microprocessor, a mobile computing device, and/or a tablet computer. In some cases, various components in the application builder environment 100 (e.g., the application builder system 105, the application builder 110, the software services 150, the application device 130, the application device 140) can be implemented on a shared computing device. Alternatively, a component in the application builder environment 100 can be implemented on multiple computing devices. In some implementations, various modules and components of the application builder environment 100 can be implemented as software, hardware, firmware, or a combination thereof. In some cases, various components in the application builder environment 100 can be implemented in software or firmware executed by a computing device.

Various components of the application builder environment 100 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2:
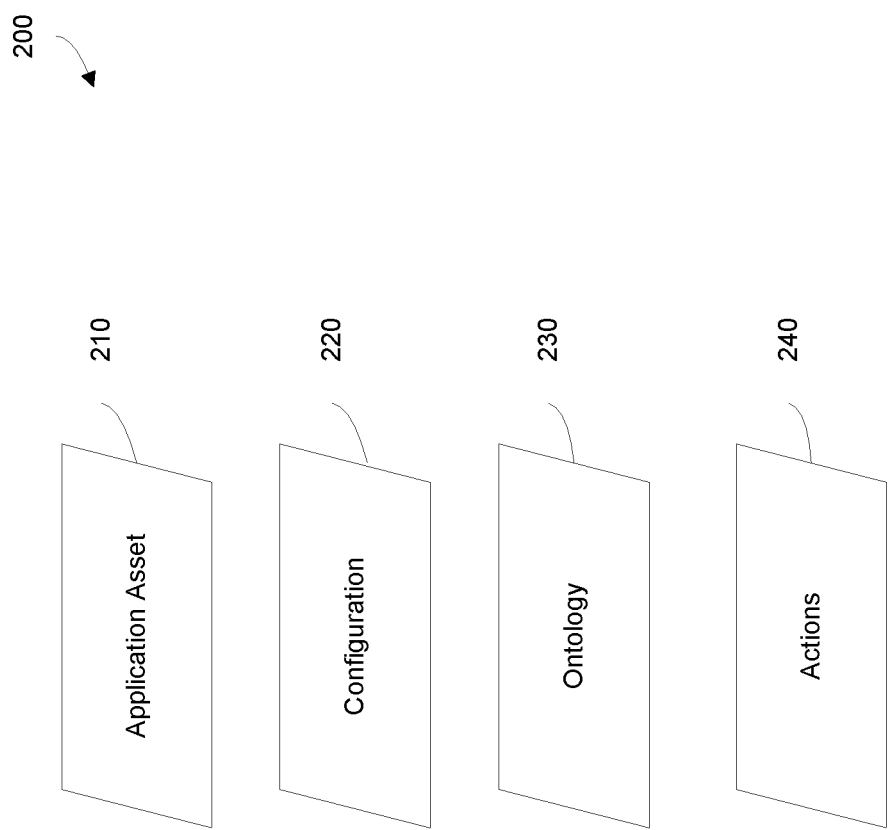
FIG. 2 is an illustrative example of a cache strategy according to certain embodiments of the present disclosure.

FIG. 2 is an illustrative example of a cache strategy 200 according to certain embodiments of the present disclosure. This diagram is merely an example. One of ordinary skill in the art would recognize many variations, alternatives, and modifications. The cache strategy 200 for includes cache layers 210, 220, 230, and 240. Although the above has been shown using a selected group of layers for the cache strategy 200 for an application builder, there can be many alternatives, modifications, and variations. For example, some of the layers may be expanded and/or combined. Other layers may be inserted and/or replaced to those noted above. Further details of these layers are found throughout the present disclosure.

According to some embodiments, the cache strategy includes one or more caching rules applied to one or more cache layers, where each caching rule of the one or more caching rules includes one or more parameters. In some embodiments, the one or more parameters includes a specification of caching object, a type of caching (e.g., time-based caching, push-based caching), cache frequency, cache time, invalidation time, network condition, purging condition, retention policy, view policy, and/or the like. In certain embodiments, the cache layers (e.g., 210, 220, 230, and 240) represent types of cached data. In some embodiments, the cache strategy 200 is determined or updated using a plurality of factors. In certain embodiments, it is important to reduce (e.g., minimize) how much data is cached, for example, to reduce bandwidth and power consumption (e.g., battery consumption).

In some embodiments, the factors for the cache strategy 200 include power consumption, bandwidth, cache frequency, transparency, and/or the like. For example, running many background tasks and synchronizations can consume a significant amount of power (e.g., battery power). In some examples, the cache strategy 200 includes a caching rule on when to download new data and/or send queued actions. As an example, the cache strategy 200 includes a caching rule to defer operations that require heavy bandwidth until an application is back on a stable network connection. In some examples, queued actions may not take much bandwidth so the cache strategy 200 may allow queued action sent over a relatively low bandwidth network (e.g., $3^{rd}$ Generation cellular network (3G)). In certain examples, the cache strategy 200 may set a caching rule to download, upload, or synchronize data for a data-intensive application when the application is on a stable network (e.g., WiFi network).

In certain embodiments, the cache strategy 200 includes a caching rule on a cache frequency (e.g., how frequently should data be cached for offline reads). In some examples, the cache strategy 200 includes a caching rule on whether the cache frequency can be configurable, for example, by a user. In some embodiments, the cache strategy 200 includes a caching rule on transparency. In some embodiments, a caching rule on transparency specifies whether users can view all of the data that's being cached, purge the cache, and "unsubscribe" from caching rules if they wish. In certain embodiments, a caching rule on transparency includes a caching rule on retention. In one example, the caching rule on retention is a rule to remove certain cache data if the cache data is not accessed in a predetermined amount time. In some embodiments, the cache strategy 200 includes one or more cache rules on when certain data should be cached and/or when certain data should be invalidated.

According to certain embodiments, the cache strategy 200 includes one or more caching rules on application asset cache layer 210. In some embodiments, the application asset cache layer 210 includes one or more software components, for examples, software components written in java, C, C #, C++, HTML, other programming language, and/or other script language.

According to some embodiments, the cache strategy 200 includes one or more caching rules on configuration cache layer 220. In certain embodiments, the configuration cache layer 220 includes semi-static configurations including, for example, configurations related to ontology configurations, software application configurations, workspace configurations, and/or other configurations. In some embodiments, the configuration data can change, but changes are relatively infrequent, for example, less frequent than the changes of ontology data.

According to certain embodiments, the cache strategy 200 includes one or more caching rules on ontology cache layer 230. In some examples, the ontology cache layer includes ontology data including, for example, objects, object sets, aggregation results, functions, algorithms, models, and/or the like. In certain embodiments, the ontology data of the ontology cache layer 230 can be loaded across one or more software services (e.g., backend services). In some embodiments, the ontology data loads can be triggered via software interfaces and user interfaces, for example, when an object is selected, and linked objects can be loaded. In certain embodiments, the ontology data load can be triggered by one or more software widgets (e.g., object picker, user selectors) querying a backend system (e.g., servers, data center, database) to retrieve data (e.g., query results), and the retrieved data can be cached according to a caching rule on ontology data.

According to some embodiments, the cache strategy 200 including one or more caching rules on action (e.g., user-input actions, user states) cache layer 240. In one example, after a user fills out a form and submits it offline, the cache strategy 200 is configured to cache the action associated with the submitted form and its parameters.

Figure 3:
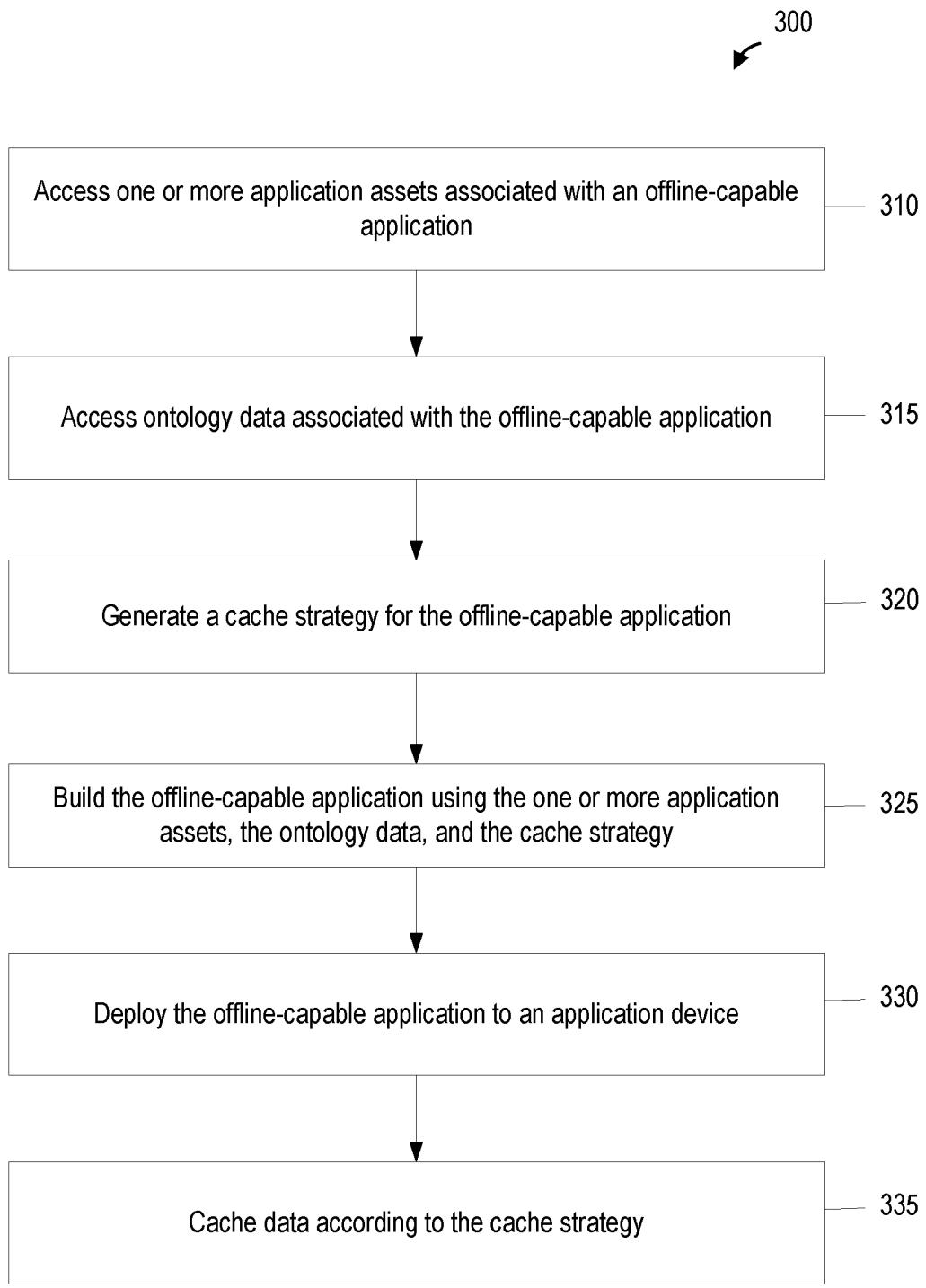
FIG. 3 is a simplified diagram showing a method for building and deploying an offline-capable application according to certain embodiments of the present disclosure.

FIG. 3 is a simplified diagram showing a method 300 for building and deploying an offline-capable application according to certain embodiments of the present disclosure. This diagram is merely an example. One of ordinary skill in the art would recognize many variations, alternatives, and modifications. The method 300 for building and deploying an offline-capable application includes processes 310, 315, 320, 325, 330, and 335. Although the above has been shown using a selected group of processes for the method 300 for building and deploying an offline-capable application, there can be many alternatives, modifications, and variations. For example, some of the processes may be expanded and/or combined. Other processes may be inserted to those noted above. Depending upon the embodiment, the sequence of processes may be changed, and one or more processes may be replaced. Further details of these processes are found throughout the present disclosure.

According to some embodiments, at the process 310, an application builder system (e.g., the application builder system 105 in FIG. 1) is configured to access one or more application assets associated with the offline-capable application, for example, from an application asset repository. In some embodiments, at the process 315, the application builder system is configured to access ontology data associated with the offline-capable application. In certain embodiments, at the process 320, the application builder system is configured to generate a cache strategy for the offline-capable application.

According to certain embodiments, the application builder system is configured to generate the cache strategy for the one or more offline-capable application (e.g., application 132 in FIG. 1, application 142 in FIG. 1), where the cache strategy includes one or more caching rules. In some embodiments, the application builder system is configured to generate the cache strategy based at least in part upon the application assets and the ontology data associated with the corresponding application. In certain embodiments, the application builder system is configured to generate the cache strategy based at least in part upon one or more actions associated with the corresponding application. In some embodiments, at least one caching rule of the one or more caching rules comprises one or more parameters. In certain embodiments, the one or more parameters comprise a specification of cached data and a cache condition. In some embodiments, the cached data comprises at least one selected from a group consisting of ontology data, one or more actions, one or more application assets, and one or more configurations. In certain embodiments, the cache condition comprises at least one selected from a group consisting of a type of caching, a cache frequency, a cache time, an invalidation time, an invalidation condition, a network condition, and a purging condition.

In some embodiments, the cache strategy includes one or more caching rules applied to one or more cache layers (e.g., one or more types of application data), where each caching rule of the one or more caching rules includes one or more parameters. In some embodiments, the one or more parameters includes a specification of caching object, a type of caching (e.g., time-based caching, push-based caching), a cache frequency, a cache time, a cache condition, invalidation time, network condition, purging condition, retention policy, view policy, and/or the like. In certain embodiments, the cache layers represent types of cached data.

According to certain embodiments, the application builder system includes an interface to receive inputs to the cache strategy. In some examples, the interface includes a user interface. In certain examples, the interface includes one or more software interfaces to receive inputs from other systems and/or software services. In some embodiments, the inputs to the cache strategy include an input on the ontology data (e.g., an object, a relationship between objects, etc.) associated with a respective offline-capable application. In certain embodiments, the inputs to cache strategy include an input on one or more application assets (e.g., data processing logics) associated with the offline-capable application. In some embodiments, the inputs to the cache strategy include an input on actions (e.g., the data processing logic applied to an object) associated with the offline-capable application. In certain embodiments, the inputs to cache strategy include an input on one or more configurations (e.g., whether a last saved status of the application should be used) associated with the offline-capable application.

In some embodiments, the cache strategy is generated or updated using a plurality of factors. In certain embodiments, it is important to reduce (e.g., minimize) how much data is cached, for example, to reduce bandwidth and power consumption (e.g., battery consumption). In some embodiments, the application builder system includes an interface to receive inputs to the cache strategy. In certain embodiments, the application builder system is configured to generate the cache strategy based at least in part on one or more factors, where the one or more factors comprise at least one selected from a group consisting of a power consumption, a connection bandwidth, a cache frequency, and a transparency requirement.

According to certain embodiments, at the process 325, the application builder system is configured to build the offline-capable application using the one or more application assets, the ontology data, and the cache strategy. In some embodiments, at the process 330, the application builder system is configured to deploy the offline-capable application to an application device (e.g., application device 130 in FIG. 1, application device 140 in FIG. 1). In certain embodiments, at the process 335, the application device is configured to cache data according to the cache strategy.

Figure 4:
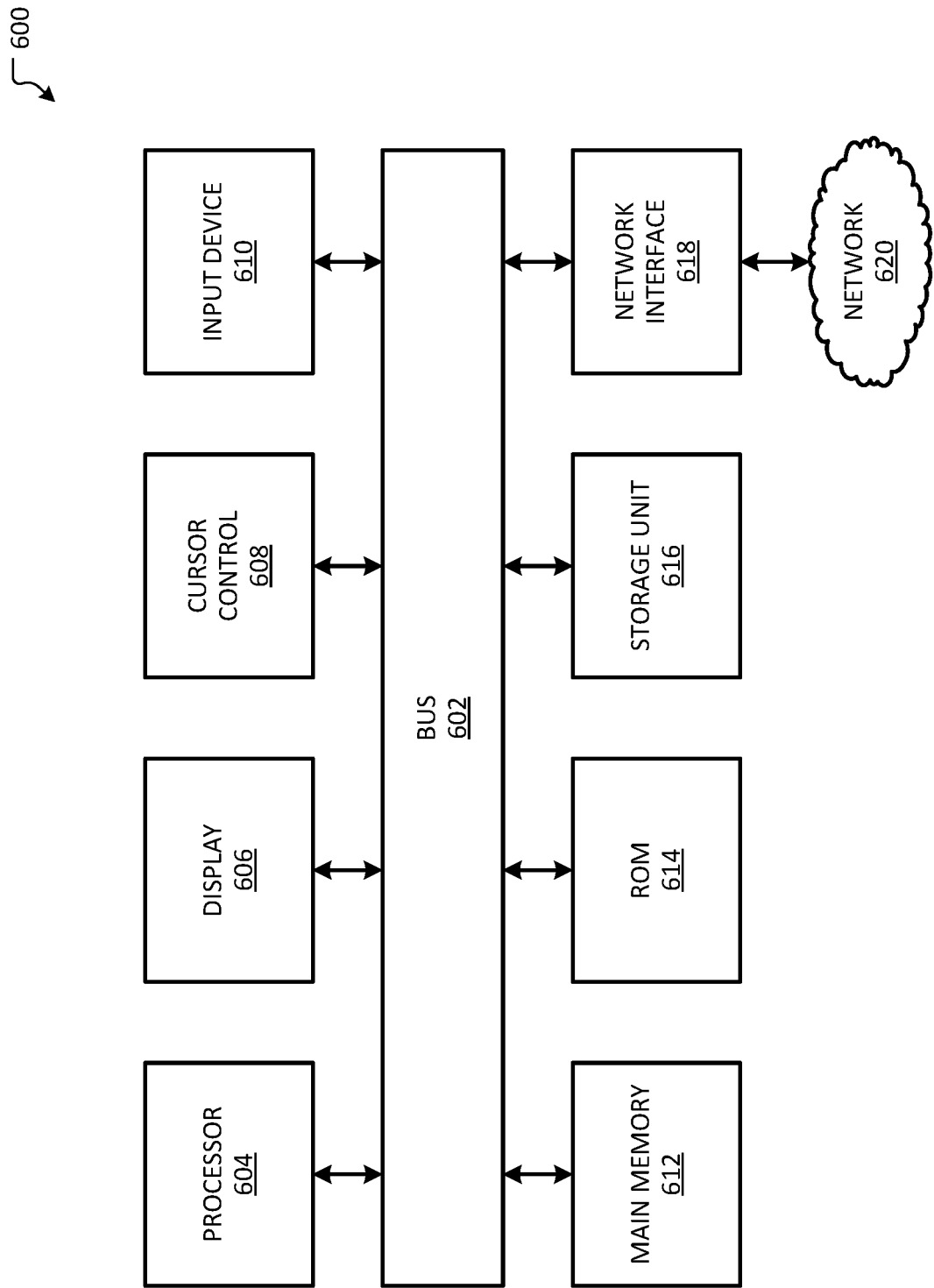
FIG. 4 is a simplified diagram showing a computing system for implementing a system for building and deploying an offline-capable application in accordance with at least one example set forth in the disclosure.

FIG. 4 is a simplified diagram showing a computing system for implementing a system 600 for building and deploying an offline-capable application in accordance with at least one example set forth in the disclosure. This diagram is merely an example, which should not unduly limit the scope of the claims. One of ordinary skill in the art would recognize many variations, alternatives, and modifications.

The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the method 300 are performed by the computing system 600. In some examples, the bus 602 is coupled to the processor 604, the display 606, the cursor control component 608, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For example, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control component 608 (e.g., a mouse, a trackball, or cursor direction keys) is configured to communicate additional information and commands (e.g., to control cursor movements on the display 606) to the processor 604.

According to some embodiments, a method for building an offline-capable application, the method comprising: accessing an ontology associated with the offline-capable application; accessing one or more application assets associated with the offline-capable application; generating a cache strategy for the offline-capable application, the cache strategy comprising one or more caching rules, at least one caching rule of the one or more caching rules comprising one or more parameters, the one or more parameters comprising a specification of cached data and a cache condition; and building the offline-capable application using the ontology and the one or more application assets based at least in part upon the caching strategy, wherein the offline-capable application is configured to cache data according to the cache strategy. For example, the method for building an offline-capable application is implemented according to at least FIG. 1, FIG. 2, and/or FIG. 3.

In some embodiments, the generating a cache strategy for the offline-capable application comprises generating the cache strategy based at least in part on the ontology associated with the offline-capable application. In certain embodiments, the generating a cache strategy for the offline-capable application comprises generating the cache strategy based at least in part on the ontology associated with the offline-capable application. In some embodiments, the generating a cache strategy for the offline-capable application comprises generating the cache strategy based at least in part on one or more factors, wherein the one or more factors comprise at least one selected from a group consisting of a power consumption, a connection bandwidth, a cache frequency, and a transparency requirement.

In certain embodiments, the ontology associated with the offline-capable application comprises at least one selected from a group consisting of one or more objects, one or more relationships, one or more processing results, and one or more functions. In some embodiments, the cached data comprises at least one selected from a group consisting of ontology data, one or more actions, one or more application assets, and one or more configurations. In certain embodiments, the cache condition comprises at least one selected from a group consisting of a type of caching, a cache frequency, a cache time, an invalidation time, an invalidation condition, a network condition, and a purging condition.

In some embodiments, the method further comprises: receiving an input associated with the offline-capable application; wherein the generating a cache strategy for the offline-capable application comprises generating the cache strategy based at least in part on the input. In certain embodiments, the input comprises an input on the ontology associated with the offline-capable application. In some embodiments, the receiving an input associated with the offline-capable application comprises receiving the input from a user interface.

According to certain embodiments, a computing device comprising: one or more memories having instructions stored thereon; and one or more processors configured to execute the instructions and perform the operations comprising: accessing an ontology associated with the offline-capable application; accessing one or more application assets associated with the offline-capable application; generating a cache strategy for the offline-capable application, the cache strategy comprising one or more caching rules, at least one caching rule of the one or more caching rules comprising one or more parameters, the one or more parameters comprising a specification of cached data and a cache condition; and building the offline-capable application using the ontology and the one or more application assets based at least in part upon the caching strategy, wherein the offline-capable application is configured to cache data according to the cache strategy. For example, the computing device for building an offline-capable application is implemented according to at least FIG. 1, FIG. 2, and/or FIG. 3.

In some embodiments, the generating a cache strategy for the offline-capable application comprises generating the cache strategy based at least in part on the ontology associated with the offline-capable application. In certain embodiments, the generating a cache strategy for the offline-capable application comprises generating the cache strategy based at least in part on the ontology associated with the offline-capable application. In some embodiments, the generating a cache strategy for the offline-capable application comprises generating the cache strategy based at least in part on one or more factors, wherein the one or more factors comprise at least one selected from a group consisting of a power consumption, a connection bandwidth, a cache frequency, and a transparency requirement.

In certain embodiments, the ontology associated with the offline-capable application comprises at least one selected from a group consisting of one or more objects, one or more relationships, one or more processing results, and one or more functions. In some embodiments, the cached data comprises at least one selected from a group consisting of ontology data, one or more actions, one or more application assets, and one or more configurations. In certain embodiments, the cache condition comprises at least one selected from a group consisting of a type of caching, a cache frequency, a cache time, an invalidation time, an invalidation condition, a network condition, and a purging condition.

In some embodiments, the operations further comprise: receiving an input associated with the offline-capable application; where the generating a cache strategy for the offline-capable application comprises generating the cache strategy based at least in part on the input. In certain embodiments, the input comprises an input on the ontology associated with the offline-capable application. In some embodiments, the receiving an input associated with the offline-capable application comprises receiving the input from a user interface.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for building an offline-capable application, the method comprising:
    accessing an ontology associated with the offline-capable application, the ontology including a plurality of objects and a plurality of actions, the plurality of actions being applicable to the plurality of objects;
    accessing one or more application assets associated with the offline-capable application;
    generating a cache strategy for the offline-capable application, the cache strategy comprising one or more caching rules, at least one caching rule of the one or more caching rules comprising one or more parameters, the one or more parameters comprising a specification of cached data and a cache condition, wherein a piece of data associated with the offline-capable application is configured to be stored in a cache if the piece of data satisfies the specification of the cached data; and
    building the offline-capable application using the ontology and the one or more application assets based at least in part upon the caching strategy, wherein the offline-capable application is configured to cache data according to the cache strategy.

2. The method of claim 1, wherein the generating a cache strategy for the offline-capable application comprises generating the cache strategy based at least in part on the ontology associated with the offline-capable application.

3. The method of claim 1, wherein the generating a cache strategy for the offline-capable application comprises generating the cache strategy based at least in part on one or more factors, wherein the one or more factors comprise at least one selected from a group consisting of a power consumption, a connection bandwidth, a cache frequency, and a transparency requirement.

4. The method of claim 1, wherein the ontology associated with the offline-capable application comprises at least one selected from a group consisting of one or more objects, one or more relationships, one or more processing results, and one or more functions.

5. The method of claim 1, wherein the cached data comprises at least one selected from a group consisting of ontology data, one or more actions, one or more application assets, and one or more configurations.

6. The method of claim 1, wherein the cache condition comprises at least one selected from a group consisting of a type of caching, a cache frequency, a cache time, an invalidation time, an invalidation condition, a network condition, and a purging condition.

7. The method of claim 1, further comprising:
    receiving an input associated with the offline-capable application;
    wherein the generating a cache strategy for the offline-capable application comprises generating the cache strategy based at least in part on the input.

8. The method of claim 7, wherein the input comprises an input on the ontology associated with the offline-capable application.

9. The method of claim 7, wherein the receiving an input associated with the offline-capable application comprises receiving the input from a user interface.

10. A computing device, comprising:
    one or more memories having instructions stored thereon; and
    one or more processors configured to execute the instructions and perform the operations comprising:
        accessing an ontology associated with the offline-capable application, the ontology including a plurality of objects and a plurality of actions, the plurality of actions being applicable to the plurality of objects;
        accessing one or more application assets associated with the offline-capable application;
        generating a cache strategy for the offline-capable application, the cache strategy comprising one or more caching rules, at least one caching rule of the one or more caching rules comprising one or more parameters, the one or more parameters comprising a specification of cached data and a cache condition, wherein a piece of data associated with the offline-capable application is configured to be stored in a cache if the piece of data satisfies the specification of the cached data; and
        building the offline-capable application using the ontology and the one or more application assets based at least in part upon the caching strategy, wherein the offline-capable application is configured to cache data according to the cache strategy.

11. The computing device of claim 10, wherein the generating a cache strategy for the offline-capable application comprises generating the cache strategy based at least in part on the ontology associated with the offline-capable application.

12. The computing device of claim 10, wherein the generating a cache strategy for the offline-capable application comprises generating the cache strategy based at least in part on one or more factors, wherein the one or more factors comprise at least one selected from a group consisting of a power consumption, a connection bandwidth, a cache frequency, and a transparency requirement.

13. The computing device of claim 10, wherein the ontology associated with the offline-capable application comprises at least one selected from a group consisting of one or more objects, one or more relationships, one or more processing results, and one or more functions.

14. The computing device of claim 11, wherein the cached data comprises at least one selected from a group consisting of ontology data, one or more actions, one or more application assets, and one or more configurations.

15. The computing device of claim 10, wherein the cache condition comprises at least one selected from a group consisting of a type of caching, a cache frequency, a cache time, an invalidation time, an invalidation condition, a network condition, and a purging condition.

16. The computing device of claim 10, wherein the operations further comprise:
    receiving an input associated with the offline-capable application;
    wherein the generating a cache strategy for the offline-capable application comprises generating the cache strategy based at least in part on the input.

17. The computing device of claim 16, wherein the input comprises an input on the ontology associated with the offline-capable application.

18. The computing device of claim 16, wherein the receiving an input associated with the offline-capable application comprises receiving the input from a user interface.

\* \* \* \* \*